(12) United States Patent
Przytula

(10) Patent No.: US 7,272,587 B1
(45) Date of Patent: Sep. 18, 2007

(54) GENERATION OF DECISION TREES BY MEANS OF A PROBABILISTIC MODEL

(75) Inventor: Krzysztof W. Przytula, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 290 days.

(21) Appl. No.: 11/045,707

(22) Filed: Jan. 28, 2005

(51) Int. Cl.
G06F 9/44 (2006.01)
G06N 7/02 (2006.01)
G06N 7/06 (2006.01)

(52) U.S. Cl. ...................................................... 706/52
(58) Field of Classification Search ................... 706/52
See application file for complete search history.

(56) References Cited

U.S. PATENT DOCUMENTS

| | | | |
|---|---|---|---|
| 6,021,403 A * | 2/2000 | Horvitz et al. | 706/45 |
| 6,260,035 B1 * | 7/2001 | Horvitz et al. | 706/60 |
| 6,535,865 B1 * | 3/2003 | Skaaning et al. | 706/52 |
| 6,853,952 B2 * | 2/2005 | Chadwick | 702/181 |
| 6,879,973 B2 * | 4/2005 | Skaanning et al. | 706/52 |
| 7,047,169 B2 * | 5/2006 | Pelikan et al. | 703/2 |
| 7,133,811 B2 * | 11/2006 | Thiesson et al. | 703/2 |
| 2003/0055614 A1 * | 3/2003 | Pelikan et al. | 703/2 |
| 2003/0139963 A1 * | 7/2003 | Chickering et al. | 705/10 |

OTHER PUBLICATIONS

Visualization of probabilistic business models Virine, L.; Rapley, L.; Simulation Conference, 2003. Proceedings of the 2003 Winter vol. 2, Dec. 7-10, 2003 pp. 1779-1786 vol. 2 Digital Object Identifier 10.1109/WSC.2003.1261633.*

Modeling the behaviors of players in competitive environments Shih-Yang Chiao; Xydeas, C.S.; Intelligent Agent Technology, 2003. IAT 2003. IEEE/WIC International Conference on Oct. 13-16, 2003 pp. 566-569 □□.*

A probabilistic approach for reducing the search cost in binary decision trees Rontogiannis, A.; Dimopoulos, N., Communications, Computers and Signal Processing, 1993., IEEE Pacific Rim Conference on vol. 1, May 19-21, 1993 pp. 27-30 vol. 1 Digital Object Identifier 10.1109/PACRIM.1993.407228.*

Bayesian networks as ensemble of classifiers Garg, A.; Pavlovic, V.; Huang, T.S.; Pattern Recognition, 2002. Proceedings. 16th International Conference on vol. 2, Aug. 11-15, 2002, pp. 779-784 vol. 2 Digital Object Identifier 10.1109/ICPR2002.1048418.*

Stochastic Prediction of Voltage Sags by Considering the Probability of the Failure of the Protection System Aung, M.T.; Milanovic, J.V.; Power Delivery, IEEE Transactions on vol. 21, Issue 1, Jan. 2006 pp. 322-329 Digital Object Identifier 10.1109/TPWRD.2005. 852385.*

(Continued)

Primary Examiner—Anthony Knight
Assistant Examiner—Michael B. Holmes
(74) Attorney, Agent, or Firm—Christie, Parker, & Hale

(57) ABSTRACT

A method, apparatus and computer program product for conversion of decision trees into probabilistic models such as Bayesian networks. Decisions trees are converted into probabilistic models without loss of information stored in the decision tree implicitly or explicitly. As a result, the probabilistic model is usable to reproduce the paths of the original tree. An inference algorithm can be used to reproduce the paths of the original tree from the probabilistic model.

21 Claims, 6 Drawing Sheets

OTHER PUBLICATIONS

Decision tree design using a probabilistic model (Corresp.) Casey, R.; Nagy, G.; Information Theory, IEEE Transactions on vol. 30, Issue 1, Jan. 1984 pp. 93-99.*

Fault diagnosis of plasma etch equipment Ison, A.M.; Wei Li; Spanos, C.J.; Semiconductor Manufacturing Conference Proceedings, 1997 IEEE International Symposium on Oct. 6-8, 1997 pp. B49-B52 Digital Object Identifier 10.1109/ISSM.1997.664509.*

A decision tree algorithm with segmentation Moura-Pires, F.; Steiger-Garcao, A.; Industrial Electronics, Control and Instrumentation, 1991. Proceedings. IECON '91., 1991 International Conference on Oct. 28-Nov. 1, 1991 pp. 2077-2082 vol. 3 Digital Object Identifier 10.1109/IECON.1991.239021.*

AdaTree: Boosting a Weak Classifier into a Decision Tree Grossmann, E.; Computer Vision and Pattern Recognition Workshop, 2004 Conference on Jun. 27-02, 2004 pp. 105-105 Digital Object Identifier 10.1109/CVPR.2004.22.*

Probabilistic boosting-tree: learning discriminative models for classification, recognition, and clustering Zhuowen Tu; Computer Vision, 2005. ICCV 2005. Tenth IEEE International Conference on vol. 2, Oct. 17-21, 2005 pp. 1589-1596 vol. 2 Digital Object Identifier 10.1109/ICCV.2005.194.*

Concept-based speech-to-speech translation using maximum entropy models for statistical natural concept generationLiang Gu; Yuqing Gao; Fu-Hua Liu; Picheny, M.; Audio, Speech and Language Processing, IEEE Transactions on [see also Speech and Audio Processing, IEEE Transactions on] vol. 14, Issue 2, Mar. 2006 pp. 377-392.*

Design and development of neural Bayesian approach for unpredictable stock exchange databases Khokhar, R.H.; Sap, M.N.M.; Cyberworlds, 2003. Proceedings. 2003 International Conference on 2003 pp. 364-371 Digital Object Identifier 10.1109/CYBER.2003.1253477.*

* cited by examiner

| State/Leaf | n | $k^n$ | $\frac{1}{k^n}$ |
|---|---|---|---|
| OK | 2 | 4 | 0.25 |
| F1 | 2 | 4 | 0.25 |
| F3 | 2 | 4 | 0.25 |
| F4 | 3 | 8 | 0.125 |
| F5 | 3 | 8 | 0.125 |

Fig. 3

|  | F1 - defect | F3 - defect | F4 - defect | F5 - defect | OK - no defect |
|---|---|---|---|---|---|
| T1 - test | pass | fail | fail | fail | pass |
| T2 - test | fail | - | - | - | pass |
| T3 - test | - | fail | pass | pass | - |
| T4 - test | - | - | pass | fail | - |

Fig. 4

|          | F1 - defect | F3 - defect | F4 - defect | F5 - defect | OK - no defect |
|----------|-------------|-------------|-------------|-------------|----------------|
| T3 - fail | 0.5 | 1 | 0 | 0 | 0.5 |
| T3 - pass | 0.5 | 0 | 1 | 1 | 0.5 |

Fig. 5

GENERATION OF DECISION TREES BY MEANS OF A PROBABILISTIC MODEL

BACKGROUND OF THE INVENTION

This invention relates to the field of decision systems, and in particular, a converter that can be used to convert decisions trees into probabilistic models, such as Bayesian networks, wherein the probabilistic model is usable to reproduce the original decision tree.

Decision systems are often based on decision trees. A decision tree is a data structure that consists of a root node, inner nodes, and leaves. Each node, including the root node, is connected to one or more other nodes or leaves. Such connections are called branches. Each node also represents a test whose outcome will determine which branch to follow. Branches are directed, i.e., they may only be followed in one direction. To resemble a tree structure, any node or leaf may only have one incoming branch. However, a node may have as many outgoing branches as desired. Finally, each leaf, having one incoming and no outgoing branch, represents a conclusion.

To arrive at a conclusion in a given tree, one begins at the root node and keeps performing tests until one arrives at a leaf. For example, a decision tree may assist an automobile owner or mechanic in finding the cause for a problem. Assuming the problem is that the automobile does not start, the corresponding decision tree might ask for checking the battery in its root node. If the battery is dead, the root node would include a branch leading to a conclusion leaf stating that the battery needs to be recharged or replaced. If the battery is fine, another branch could lead to a next test, for example, to check the starter, the ignition, or the fuel supply, possibly leading to more tests and eventually to a conclusion.

Decision trees have shortcomings as compared to probabilistic models. They are less accurate, less flexible, harder to maintain, and their size grows exponentially with the amount of tests contained in the decision system.

Bayesian networks, which are one example of probabilistic models, are data structures of nodes which are connected by directed links and whose capture of causal dependencies includes probabilistic models. The data structures resemble networks rather than trees, i.e., nodes may have more than one incoming link.

The nodes of a Bayesian network represent observations and conclusions while the directed links express causal dependencies between the conclusions and observations. Bayesian networks can be used to generate decision procedures by means of an inference algorithm. Particularly, an inference algorithm can recommend a path through the nodes and directed links of the Bayesian network which resembles a path through a decision tree. For each step along the way, the inference algorithm provides a ranked list of next steps based on prior observations. The user is expected to choose the top ranking recommendation, but is not limited to it. A lower ranked recommendation can be followed if the user cannot or does not want to follow the top recommendation for some reason.

For example, a Bayesian network representing the automobile trouble decision system described above could recommend to check the battery first, but also offer the lower ranked tests of checking the starter, the ignition, and the fuel supply. The user might for some reason know that the battery cannot be the problem but remember that the spark plugs are overdue and decide to test them first. Then, depending on the outcome, the system would recommend what to do next.

Bayesian networks, as well as probabilistic models in general, do not only offer this increased flexibility but are also easier to modify and some classes of probabilistic models only grow linearly in size with the amount of tests contained in the decision system.

Despite the advantages of probabilistic models, decision trees already exist for many problems and experts are familiar with capturing their decision knowledge in the form of a decision tree. For example, manufacturers of automobiles, trucks, military vehicles, locomotives, aircrafts and satellites use decision trees to express diagnostic procedures. One approach for converting the knowledge captured in a decision flowchart or tree into probabilistic models is disclosed in U.S. patent application Ser. No. 10/695,529 entitled "Apparatus, Method, and Computer Program Product for Converting Decision Flowcharts into Decision Probabilistic Graphs," the entire content of which is incorporated herein by reference. The produced probabilistic model is usable to generate decision sequences, or paths, of optimal convergence, i.e., requiring a minimal number of tests. However, some decision trees are optimized for the frequency of the occurrence of conclusions. Some decision trees are optimized for cost and effectiveness of the tests involved. In such and other cases, it is desirable that the probabilistic model be usable to generate the paths of the original decision tree. The desirability of such probabilistic models is also not limited to optimizations. In essence, a probabilistic model usable to generate the original paths of the original decision tree preserves the information of the original tree, i.e., knowledge that was captured in the decision tree implicitly or explicitly is not lost in the conversion.

Therefore, there is a need for a converter that converts decision trees into probabilistic models, such as Bayesian networks, while preserving the paths of the original decision tree. The present invention provides such a converter.

SUMMARY OF THE INVENTION

In accordance with the present invention decision trees are converted into probabilistic models, such as Bayesian networks, usable to reproduce the paths of the original decision tree.

In one embodiment of the invention, a decision tree is converted into a Bayesian network with a single conclusions node. Conclusions found in the leaves of the decisions tree are included as states of the single conclusions node. The single conclusions node is linked to further nodes that represent tests disclosed in nodes of the decision tree and include states that represent the outgoing branches of each respective node in the decision tree. Prior and conditional probabilities are computed for the states of the Bayesian network nodes. An inference algorithm can then be used to reproduce the paths of the decision tree from the Bayesian network.

In another embodiment of the invention, a Bayesian network with multiple conclusions nodes is produced, encoding additional probability information. In yet another embodiment, the decision tree is converted into a probabilistic model that is not necessarily a Bayesian network.

In one aspect of the invention, a method generates a probabilistic model from a decision tree having one or more nodes and one or more leaves, the probabilistic model being usable to reproduce the decision tree: the method receives a representation of the decision tree, creates one or more conclusions nodes using the one or more leaves of the decision tree, creates one or more observation nodes using the one or more nodes of the decision tree, creates causal links from the one or more conclusions nodes to the one or more observation nodes; and computes conditional probabilities for each node.

In another aspect of the invention, an apparatus generates a probabilistic model from a decision tree having one or more nodes and one or more leaves, the probabilistic model being usable to reproduce the decision tree: the apparatus includes a decision tree receiver for receiving a representation of the decision tree, a conclusions nodes creator for creating one or more conclusions nodes using the one or more leaves of the decision tree, an observation nodes creator for creating one or more observation nodes using the one or more nodes of the decision tree, a causal linker for creating links from the one or more conclusions nodes to the one or more observation nodes, and a conditional probability table capable of storing probabilities.

In yet another aspect of the invention, a computer program product recorded on a computer readable medium generates a probabilistic model from a decision tree having one or more nodes and one or more leaves, the probabilistic model being usable to reproduce the decision tree: the computer readable program code includes a software interface for receiving a representation of the decision tree, creates one or more conclusions nodes using the one or more leaves of the decision tree, creates one or more observation nodes using the one or more nodes of the decision tree, creates causal links from the one or more conclusions nodes to each of the one or more observation nodes, and computes conditional probabilities for each node.

While the present invention can be configured to receive decision trees in various formats, an exemplary embodiment of the invention receives decision trees in Decision Tree Markup Language or DTML format. Similarly, while the present invention can be configured to produce various output formats, an exemplary embodiment of this invention produces output in an intermediate XML-based format. Additional conversion tools can be used to convert various decision tree formats into Decision Tree Markup Language or DTML format and to convert the XML-based output into desired output format.

BRIEF DESCRIPTION OF THE DRAWINGS

FIG. 3 shows a probabilities table for the conclusions of the decision tree shown in FIG. 1.

FIG. 4 shows a causal dependency table for the decision tree shown in FIG. 1.

FIG. 5 shows a conditional probability table for one of the nodes in the Bayesian network structure of FIG. 2.

DETAILED DESCRIPTION OF THE INVENTION

Figure 1:
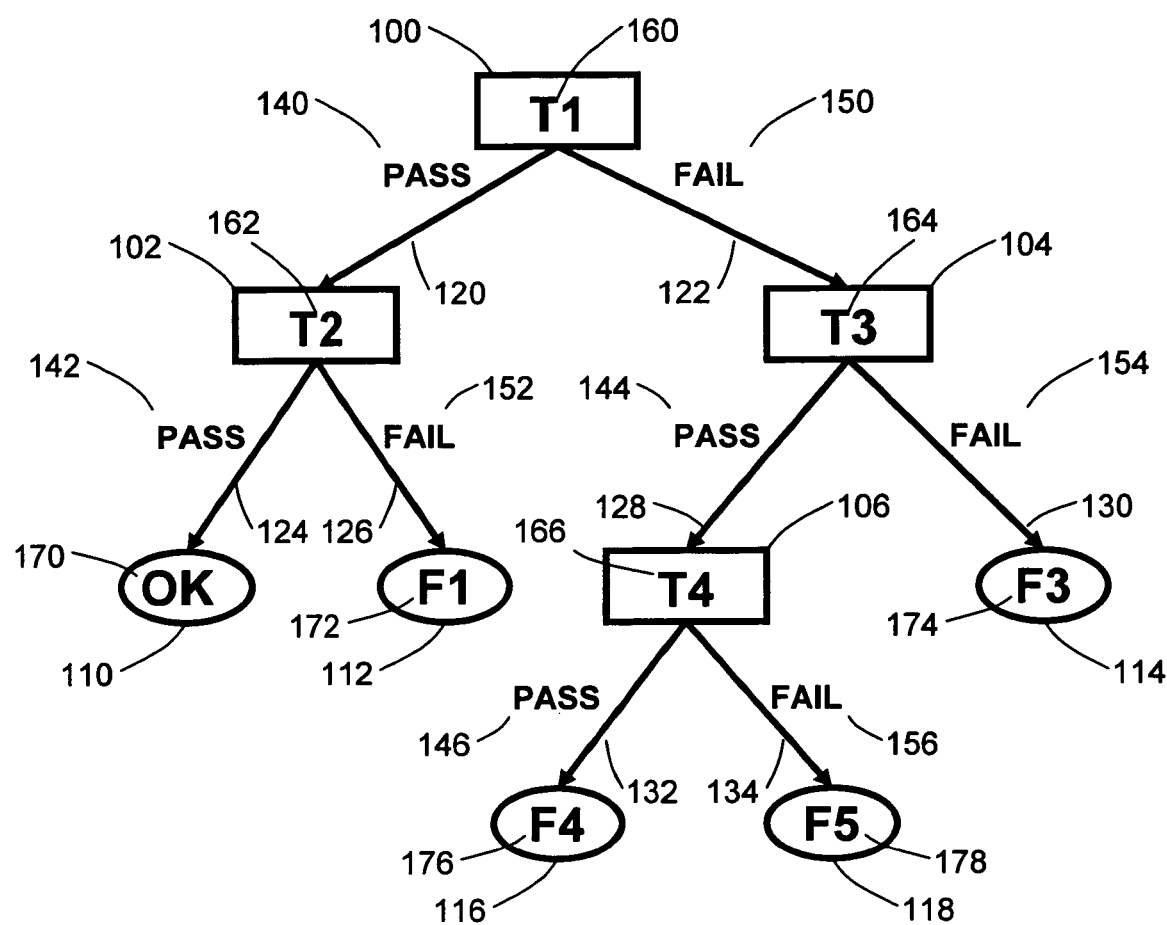
FIG. 1 shows an example of a decision tree.

FIG. 1 shows an example of a simple decision tree. It includes four nodes: root node 100 and inner nodes 102, 104, 106; and five leaves 110, 112, 114, 116, 118. Node 100 has two outgoing branches 120, 122 with one branch labeled PASS 140 and one branch labeled FAIL 150. Node 102 has two outgoing branches 124, 126 with one branch labeled PASS 142 and one branch labeled FAIL 152. Node 104 has two outgoing branches 128, 130 with one branch labeled PASS 144 and one branch labeled FAIL 154. Node 106 has two outgoing branches 132, 134 with one branch labeled PASS 146 and one branch labeled FAIL 156. Note that FIG. 1 shows a simple decision tree for illustrative purposes. In practice, decision trees are generally much larger, often have more than two outgoing branches per node, and the number of branches per node may also vary within a tree.

Node 100 of the decision tree of FIG. 1 represents test T1 160. Node 102 represents test T2 162. Node 104 represents test T3 164. Node 106 represents test T4 166. Leaf 110 of the decision tree represents the conclusion OK 170. Leaf 112 represents the conclusion F1 172. Leaf 114 represents the conclusion F3 174. Leaf 116 represents the conclusion F4 176. Leaf 118 represents the conclusion F5 178.

This decision tree could, for example, represent a simple diagnostic tool for testing products. The first test to perform on the product would be T1 160 found in the decision tree's root node 100. If the product passes the test, the user of the decision tree will follow the outgoing branch 120 labeled PASS 140, arriving at a second test T2 162 found in node 102. If the product also passes this test, the user will again follow the outgoing branch 124 labeled PASS 142, this time leading to leaf 110. Leaf 110 is labeled OK 170, meaning that the product is acceptable. Had the product not passed test T2 162, the user would have followed the other outgoing branch 126 labeled FAIL 152 to leaf 112, providing conclusion F1 172, which could stand for "failure of type 1." Hence, depending on the outcome of each test, a user will eventually arrive at one of the decision tree's leaves 110, 112, 114, 116, 118, providing one of the conclusions 170, 172, 174, 176, 178.

Figure 2:
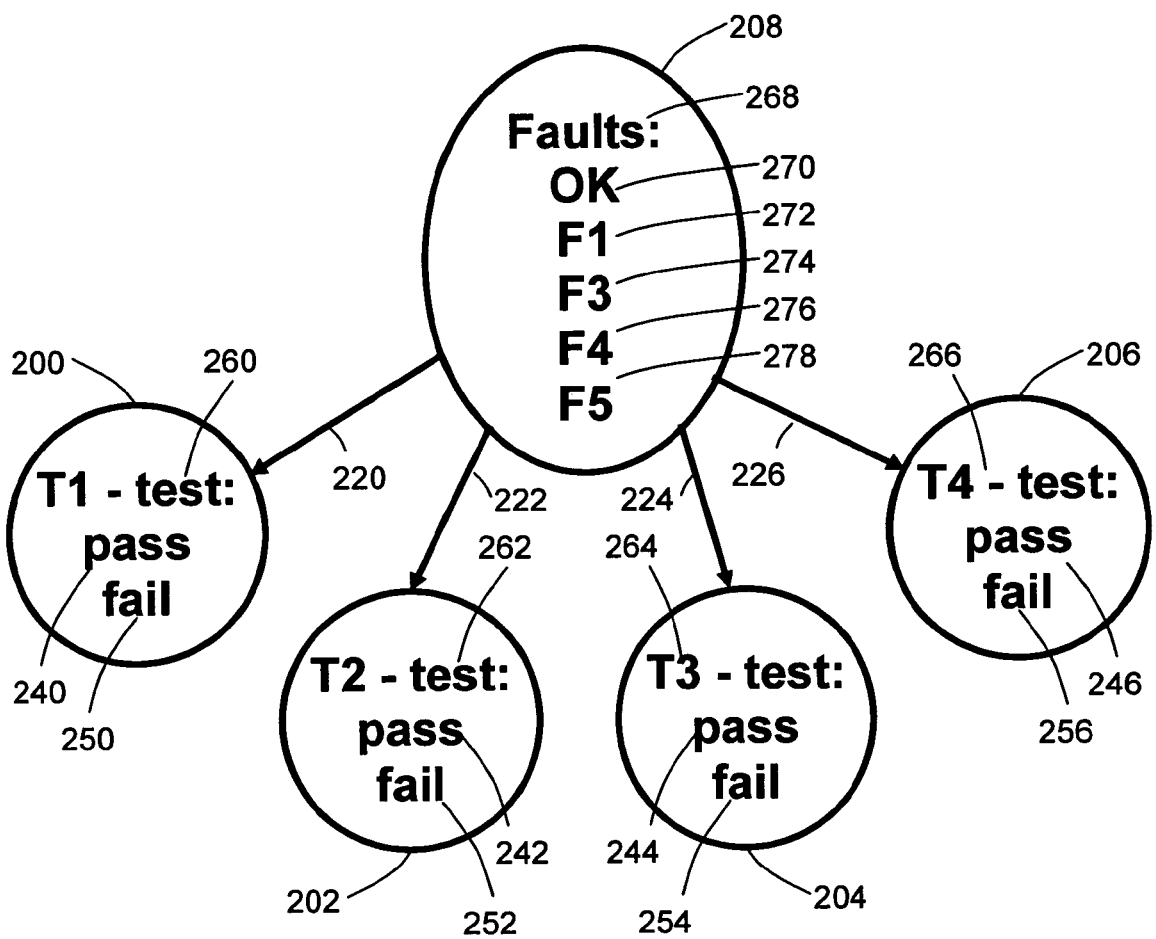
FIG. 2 shows a structure of a Bayesian network resulting from a conversion of the decision tree shown in FIG. 1.

FIG. 2 shows the structure of a Bayesian network representing the decision tree of FIG. 1. Node 208 of the Bayesian network contains the label "Faults" 268 and all the conclusions 170, 172, 174, 176, 178 from the leaves 110, 112, 114, 166, 118 of the decision tree as states 270, 272, 274, 276, 278. Nodes 200, 202, 204, 206 of the Bayesian network have the labels "T1-test" 260, "T2-test" 262, "T3-test" 264, and "T4-test" 266, respectively, which were derived from the decision tree nodes 100, 102, 104, 106. Node 200 contains as states 240, 250 the two possible outcomes PASS 140 and FAIL 150 of test T1 160 of node 100 in the decision tree. Node 202 contains as states 242, 252 the two possible outcomes PASS 142 and FAIL 152 of test T2 162 of node 102 in the decision tree. Node 204 contains as states PASS 244 and FAIL 254 the two possible outcomes 144, 154 of test T3 164 of node 104 in the decision tree. Node 206 contains as states 246, 256 the two possible outcomes PASS 146 and FAIL 156 of test T1 166 of node 106 in the decision tree.

The converter of the present invention converts decision trees into probabilistic models by completing the following steps. Please note that a Bayesian network is used in the following description to illustrate the conversion, Bayesian networks being examples of probabilistic models.

First the converter assigns a unique label to each of the nodes in a decision tree, such as the labels T1 160, T2 162, T3 164 and T4 160 166 in the decision tree of FIG. 1. Then, the converter assigns a unique label to each of the leaves in a decision tree, such as the labels OK 170 and F1 172, F3 174, F4 176 and F5 178 in the decision tree in FIG. 1. Finally, the converter creates the Bayesian network structure, using the following process:

The converter begins with a so-called naive Bayesian network structure, i.e., it creates an empty data structure that is usable to store or be expanded into a Bayesian network structure with content. A single node for all conclusions of the decision tree is added to the naive Bayesian network structure, such as the node 208 in FIG. 2, and the node is labeled, for example "Faults," such as label 268 in FIG. 2, indicating that the conclusions indicate types of faults. Note that the conclusion OK 170 in the decision tree of FIG. 1 is also viewed as a fault indicator in the example decision system represented in the decision tree of FIG. 1. It indicates the presence of no faults. Finally, the converter adds states to the node representing the conclusions found in the decision tree. For example, the conclusions 170, 172, 174, 176, 178 of the decision tree in FIG. 1 were added as states 270, 272, 274, 276, 278 in the Bayesian network of FIG. 2.

In addition to the node containing the conclusions, the converter adds a node for each of the nodes in the decision tree, such as the nodes 200, 202, 204, 206 in the Bayesian network in FIG. 2 reflecting nodes 100, 102, 104, 106 in the decision tree in FIG. 1. Then, the converter adds as states to each of these nodes the labels of the outgoing branches of the corresponding node in the decision tree. In the example Bayesian network of FIG. 2, the states 240, 242, 244, 246, 250, 252, 254, 256 were derived from the branch labels 140, 142, 144, 146, 150, 152, 154, 156 of the decision tree in FIG. 1. Note that in this example, all nodes 100, 102, 104, 106 of the decision tree have two outgoing branches each, outgoing branches 120, 122, outgoing branches 124, 126, outgoing branches 128, 130, and outgoing branches 132, 134, respectively, with one of the outgoing branches labeled PASS 140, 142, 144, 146 and the other labeled FAIL 150, 152, 154, 156. More sophisticated trees may have nodes with varying numbers of outgoing branches and labels that differ from node to node. The Bayesian network will have as many states as the corresponding node in the decision tree has outgoing branches, which might vary from node to node, and have states that represent the labels of the outgoing branches, which might differ from node to node. The converter completes the structure of the Bayesian network by adding links, such as the links 220, 222, 224, 226 in the example Bayesian network structure in FIG. 2, from the node containing the conclusions, node 208 in the example Bayesian network structure, to the nodes corresponding to the decision tree nodes, nodes 200, 202, 204, 206 in the example Bayesian network structure.

Once the structure of the Bayesian network has been completed, the converter computes the probabilities of the individual states of the conclusions node. First, the converter determines the maximum number of outgoing branches found in any node of the decision tree. This number will be referred to as the number k. In the example decision tree of FIG. 1, the number k would be 2. Then, for each of the leaves of the decision tree, the number n of nodes in the path from the root of the tree to the leaf is counted, including the root node. FIG. 3 shows a table that shows n for each of the leaves 110 to 118 in the decision tree of FIG. 1. Then, for each leaf, k to the power of n, or $k^n$, is computed. FIG. 3 shows the results for $k^n$ for each leaf 110, 112, 114, 116, 118 of the decision tree of FIG. 1. Finally, the reciprocal value of $k^n$ is computed for each leaf, which equals the prior probability of the individual states of the conclusions node in the Bayesian network. For the example Bayesian network, whose structure is shown in FIG. 2, the probabilities of the states 270, 272, 274 276, 278 of the conclusions node 208 are shown in the last column of the table of FIG. 3. For example, the probability of the state OK 270 is 0.25, or 25%. The probability of the state F5 278 is 0.125, or 12.5%.

Finally, the converter derives the conditional probabilities for the states of the observation nodes in the Bayesian network. First, it creates a causal dependency table for the decision tree. For the example decision tree of FIG. 1, such a table is shown in FIG. 4. For each pair of tests and conclusions, the table captures which outgoing branch must be followed in the decision tree to arrive at the conclusion. In the case of the decision tree of FIG. 1, each test has two outgoing branches 120 to 132, one labeled PASS 140 to 146 and one labeled FAIL 150 to 156. The table of FIG. 4 captures which outgoing branch must be followed for each test to arrive at the conclusions listed in the column headers. For example, to arrive at conclusion F4 176, test T1 160 must fail and tests T3 164 and T4 166 must be passed. Test T2 162 is irrelevant as to the conclusion F4 176, so the table has no entry reflecting the causal dependency between conclusion F4 176 and test T2 162. To derive the conditional probability for each of the states of the observation nodes in the Bayesian network, the converter uses the causal dependency table as follows:

For each combination of observation node states and conclusion node states, the converter accepts the entry of the causal dependency table that corresponds to the observation node and the conclusion, if existent. If there is no entry, the converter assigns the reciprocal value of the number of states in the observation node as a probability to each state in the node. If there is an entry, the probability assigned to an observation node state is 1 if the state matches the entry and 0 if it does not. FIG. 5 shows the probabilities of the states 244, 254 of the observation node 204 labeled "T3-test" 264 of FIG. 2. For example, the probabilities entered in the "F1-defect" column is 0.5 for each state, which is the reciprocal value of the number of states of the observation node, because the causal dependency table of FIG. 4 shows no entry for the combination of "T3-test" and "F1-defect." The probabilities shown in FIG. 5 for the conclusion "F3-defect" show 1 for the state FAIL and 0 for the state PASS, because the entry for the combination of "T3-test" and "F4-defect" in the causal dependency table of FIG. 4 is FAIL. The state FAIL 254 of the observation node 204 matches that entry and is therefore assigned the probability 1. The state PASS 244 of the observation node 204 does not match that entry and is therefore assigned the probability 0. If the observation node had further states, all of those would be assigned a probability of 0, too.

The structure of a Bayesian network, such as the one shown in FIG. 2, forms together with the probabilities of its states—the probabilities of the states of the conclusions node and the probabilities of the states of the observation nodes, computed as described above—a Bayesian network, i.e., a probabilistic model. When the Bayesian network is used with an according inference algorithm, the resulting sequence of recommended tests will be identical with the tests suggested by a path through the original decision tree. However, unlike the decision tree, the probabilistic model allows for alternative, lower ranked test sequences. Test recommendations are ranked based on conditional mutual information for an observation node and the pertinent conclusion node states, and considering intrinsic and extrinsic evidence e known about observation node states. The following is a formula for the strength S of a recommendation of test T in respect to conclusion states f of a conclusion node F, given the evidence e:

$$S(F_f, T|e) = I(F_f, T|e)/H(F_f|e), \qquad [1]$$

where $I(F_f, T|e)$ is the conditional mutual information of T and F in respect to conclusion states f given the evidence e, and $H(F_f|e)$ is the conditional entropy of F in respect to the states f given the evidence e.

The computation of S according to formula [1] may be time-consuming in the case of very large probabilistic models. In such cases, approximate computations of S may be used. In theory, such approximate inference computations might sometimes not reproduce the paths of the original decision tree. However, experiments conducted with a plurality of decision trees and two approximate reasoning algorithms (Smile of the University of Pittsburgh and WinDx of Knowledge Industries) lead to correct reproductions of the paths of the original decision trees.

Figure 6:
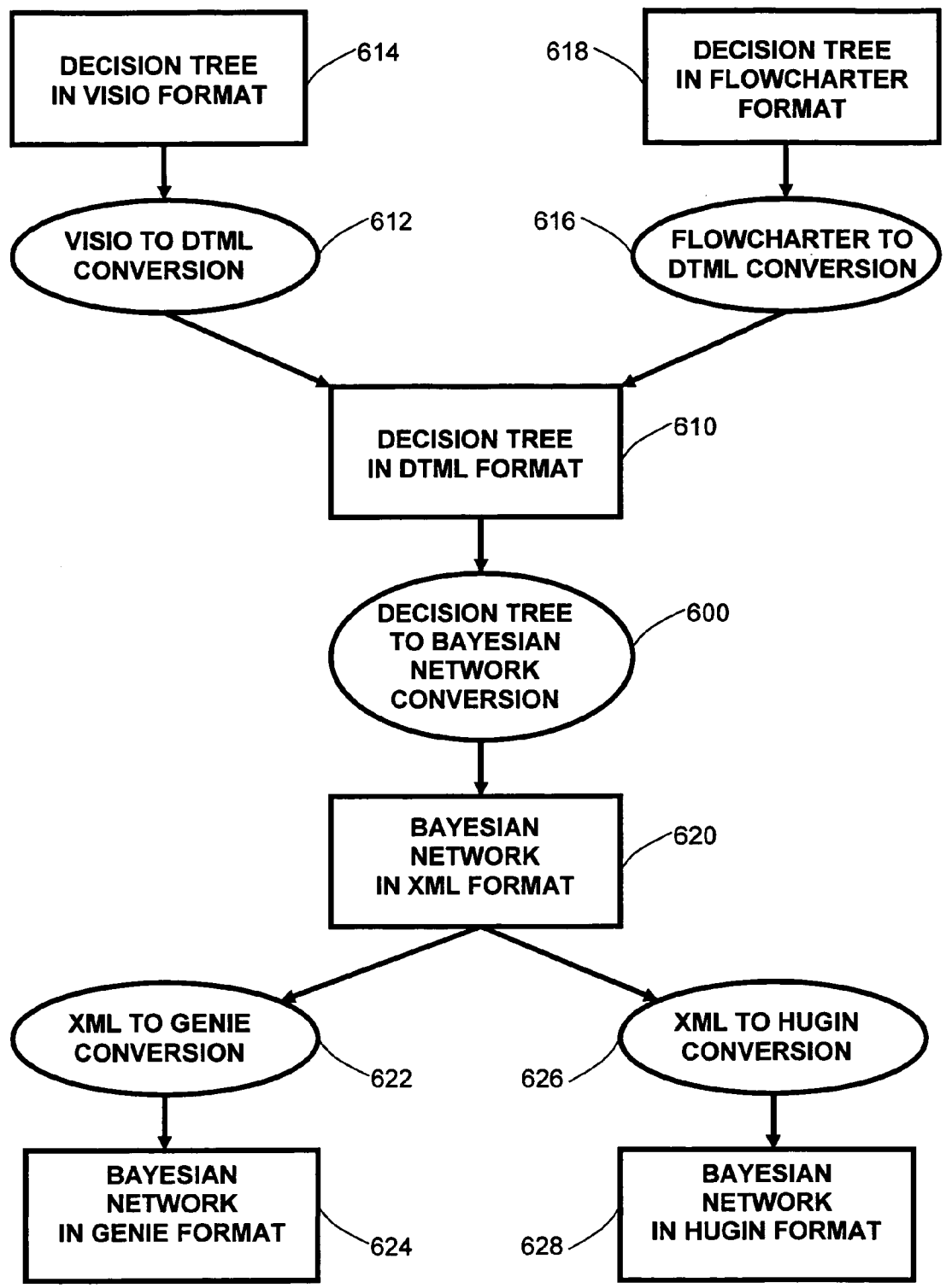
FIG. 6 shows the present invention incorporated into a software tool supporting multiple input and output formats.

FIG. 6 shows the incorporation of the converter of the present invention 600 into a software tool. The particular tool shown in FIG. 6 can accept decision tree formats created by the two commercial programs Microsoft Visio 614 and Micrografx Flowcharter 618. However, virtually any format that is usable to specify decision trees can be supported. The tool converts a provided decision tree format into an intermediate XML-based format called Decision Tree Markup Language, or DTML 610, using conversion tools, such as 612, 616 shown in FIG. 6. This intermediate representation is then used as input by the present invention. To allow for further compatibility, an exemplary embodiment of the converter in accordance with the present invention also produces output in an intermediate format. In FIG. 6, the converter of the present invention is shown to output probabilistic models, such as Bayesian networks, in an intermediate XML-based format. This format can then be converted by conversion tools, such as 622, 626, into formats that can be understood by other tools, for example GeNIe (by the University of Pittsburgh) 624 and tools offered by Hugin Expert A/S 628.

Modifications may be made to the embodiments described above that are still within the scope of the invention. For example, the Bayesian network produced by the exemplary embodiment described above is a single-conclusions-node model. Using additional probability information, another embodiment of the present invention could produce multiple conclusions nodes. Yet another embodiment of the present invention could produce a probabilistic model that is not necessarily a Bayesian network.

What is claimed is:

1. A method for generating a probabilistic model from a decision tree having one or more nodes and one or more leaves, the probabilistic model being usable to reproduce the decision tree, comprising:
   receiving a representation of the decision tree;
   creating one or more conclusions nodes using the one or more leaves of the decision tree;
   creating one or more observation nodes using the one or more nodes of the decision tree;
   creating causal links from the one or more conclusions nodes to the one or more observation nodes; and
   computing conditional probabilities for each node.

2. The method of claim 1 wherein the probabilistic model is a Bayesian network.

3. The method of claim 1, wherein the representation of the decision tree is obtained in a Decision Tree Markup Language (DTML) format.

4. The method of claim 1, wherein the one or more conclusions nodes include states representing the one or more leaves of the decision tree.

5. The method of claim 4, wherein the number of observation nodes equals the number of nodes in the decision tree and where each observation node relates to one node in the decision tree.

6. The method of claim 5, wherein each of the one or more observation nodes includes a state for each outgoing branch of the related node in the decision tree.

7. The method of claim 6, wherein computing of the conditional probabilities comprises:
   deriving probabilities for the states of the one or more conclusions nodes from the decision tree;
   creating a causal dependency table capturing causal dependencies between the one or more leaves of the decision tree and the one or more nodes of the decision tree; and
   deriving the probabilities for the states of the one or more observation nodes using the probabilities for the states of the one or more conclusions nodes and the causal dependency table.

8. An apparatus for generating a probabilistic model from a decision tree having one or more nodes and one or more leaves, the probabilistic model being usable to reproduce the decision tree, comprising:
   a decision tree receiver for receiving a representation of the decision tree;
   a conclusions nodes creator for creating one or more conclusions nodes using the one or more leaves of the decision tree;
   an observation nodes creator for creating one or more observation nodes using the one or more nodes of the decision tree;
   a causal linker for creating links from the one or more conclusions nodes to the one or more observation nodes; and
   a conditional probability table capable of storing probabilities.

9. The method of claim 8 wherein the probabilistic model is a Bayesian network.

10. The apparatus of claim 8, wherein the decision tree receiver is capable of receiving the representation of the decision tree in a Decision Tree Markup Language (DTML) format.

11. The apparatus of claim 8, wherein the conclusions nodes creator includes states representing the one or more leaves of the decision tree in the one or more conclusions nodes.

12. The apparatus of claim 11, wherein the number of observation nodes created by the observation nodes creator equals the number of nodes in the decision tree and where the observation nodes creator relates each observation node to one node in the decision tree.

13. The apparatus of claim 12, wherein the observation nodes creator includes a state for each outgoing branch of the related node in the decision tree in each of the one or more observation nodes.

14. The apparatus of claim 13, wherein probabilities stored in the conditional probability table are computed comprising:
   deriving probabilities for the states of the one or more conclusions nodes from the decision tree;
   creating a causal dependency table capturing causal dependencies between the one or more leaves of the decision tree and the one or more nodes of the decision tree; and
   deriving the probabilities for the states of the one or more observation nodes using the probabilities for the states of the one or more conclusions nodes and the causal dependency table.

15. A computer program product recorded on a computer readable medium for generating a probabilistic model from a decision tree having one or more nodes and one or more leaves, the probabilistic model being usable to reproduce the decision tree, comprising:

computer readable program code with a software interface for receiving a representation of the decision tree;

computer readable program code creating one or more conclusions nodes using the one or more leaves of the decision tree;

computer readable program code creating one or more observation nodes using the one or more nodes of the decision tree;

computer readable program code creating causal links from the one or more conclusions nodes to each of the one or more observation nodes; and computer readable program code computing conditional probabilities for each node.

16. The method of claim 15 wherein the probabilistic model is a Bayesian network.

17. The computer program product of claim 15, wherein the software interface is usable to receive the representation of the decision tree in a Decision Tree Markup Language (DTML) format.

18. The computer program product of claim 15, wherein the computer readable program code includes states representing the one or more leaves of the decision tree in the one or more conclusions nodes.

19. The computer program product of claim 18, wherein the number of observation nodes created by the computer readable program code equals the number of nodes in the decision tree and where the computer readable program code relates each observation node to one node in the decision tree.

20. The computer program product of claim 19, wherein the computer readable program code includes a state for each outgoing branch of the related node in the decision tree in each of the one or more observation nodes.

21. The computer program product of claim 20, wherein the computer readable program code computes the conditional probabilities comprising:

deriving probabilities for the states of the one or more conclusions nodes from the decision tree;

creating a causal dependency table capturing causal dependencies between the one or more leaves of the decision tree and the one or more nodes of the decision tree; and deriving the probabilities for the states of the one or more observation nodes using the probabilities for the states of the one or more conclusions nodes and the causal dependency table.

* * * * *